Aug. 28, 1928.
C. A. DAWLEY
1,682,602
FLOW METER
Filed April 5, 1924    2 Sheets-Sheet 1
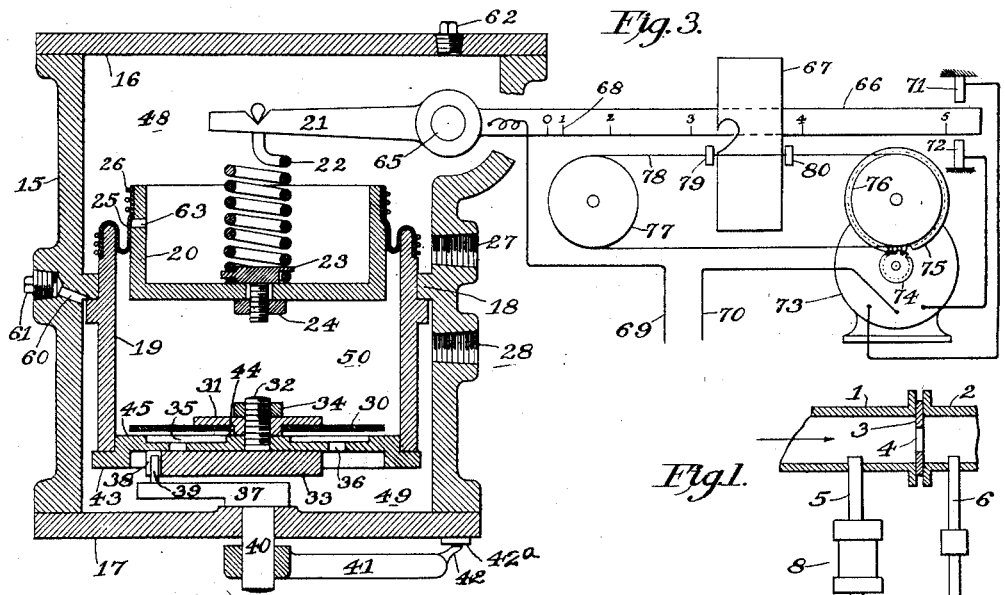
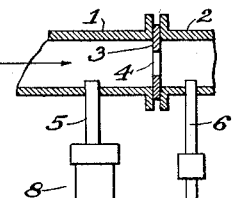
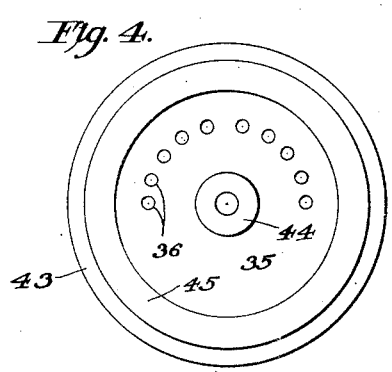
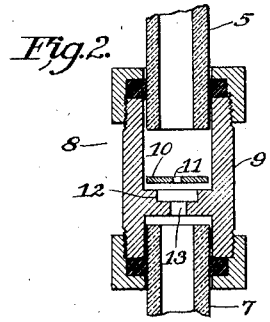
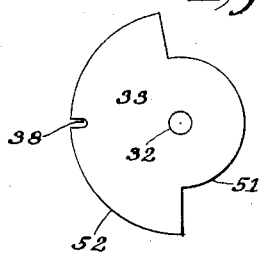
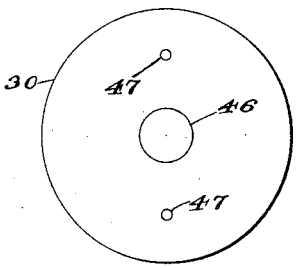
Inventor
Clarence A. Dawley

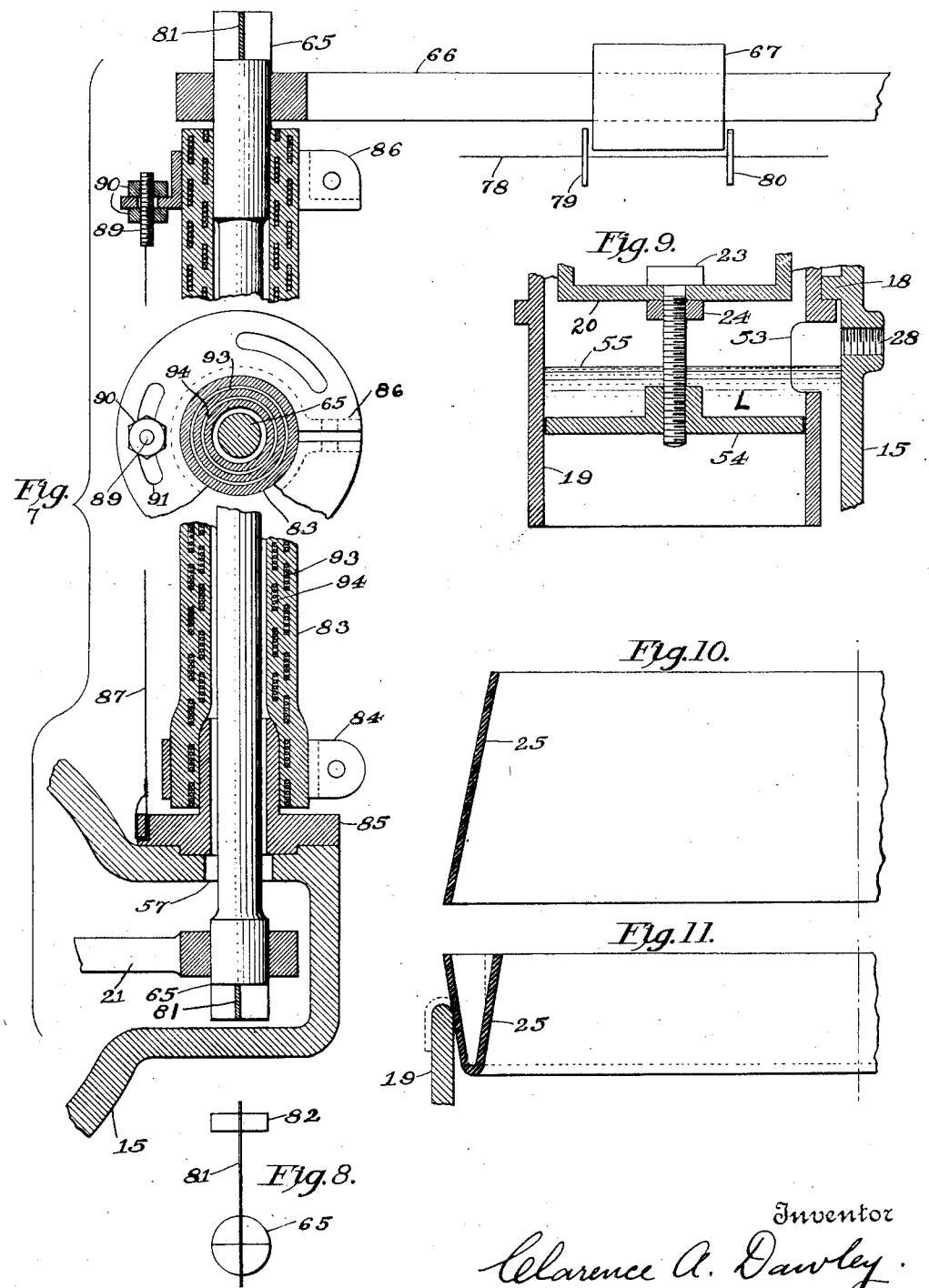

Patented Aug. 28, 1928.

1,682,602

UNITED STATES PATENT OFFICE.

CLARENCE A. DAWLEY, OF PLAINFIELD, NEW JERSEY.

FLOW METER.

Application filed April 5, 1924. Serial No. 704,465.

My invention relates to flow meters of the type in which quantity flowing is determined by the varying pressure drop or "head" produced by means of a Venturi tube, Pitot tube, disc orifice or similar device, inserted in the flow stream. In a broad sense, such meters include a device for creating head and a manometer or other form of differential gauge for measuring the head produced. In a more restricted sense, and as often used in practice, the meter itself is merely the differential gauge or instrument which receives and measures the head. My invention comprises an improved differential gauge which is adapted for use with any of the usual devices for establishing a head which is a function of the rate of flow, and is also adapted to other uses.

The object of my invention is to provide an improved type of differential gauge, simple and reliable in action, requiring no mercury, having no floats, free from stuffing boxes, magnets, solenoids, etc., capable of measuring either steady or pulsating flow and having a readily adjustable compensating device adapting it for handling different conditions of pulsating flow and different degrees or intensities of pulsation. Another object of my invention is to eliminate the necessity of having considerable mechanical motion in a member which passes from inside the pressure chamber of the meter to the outside, and to provide for frictionless action of such member. Further objects are pointed out in the description and claims.

In the accompanying drawings, Fig. 1 shows an elementary form of flow meter in which a fluid, for example water, flows past a restricted disc held between flanges of a pipe, thereby producing a differential pressure or head. The head is measured on a manometer containing a liquid, for example mercury, which is heavier than the fluid being measured. The head is represented by the height $h$ of the manometer liquid. A pulsation compensating device 8 is indicated in the manometer and is shown in more detail in Fig. 2. I do not in this application claim the pulsation compensated liquid manometer of Fig. 1 and Fig. 2 as it forms the subject of my co-pending application Serial number 704,243, filed April 4, 1924. It is here shown merely to point out the comparative advantages of my present invention. Fig. 3 is an elevation, principally in section, of my improved meter. Figs. 4, 5 and 6 are plan views of parts of the meter which will be described later. Fig. 7 is a sectional plan view of the means for taking out, from the pressure body of the meter, a motion or force which is a function of the rate of flow being measured. The view is broken away to show an elevation, partly in section, of this part of the device. Fig. 8 is an elevation referring to Fig. 7. Fig. 9 is a partial elevation of a modification of the construction shown in Fig. 3. Figs. 10 and 11 show, on an enlarged scale, the form and development of membrane shown in Fig. 3.

Referring to Fig. 1, 1 and 2 show sections of a pipe with a disc 3 held between the pipe flanges. Disc 3 has an orifice 4 of smaller diameter than the pipe. Pressure pipes 5 and 6 connect manometer 7 with the pressures on opposite sides of the disc orifice. Mercury in the manometer shows by its its elevation $h$, the head produced by flow passing the orifice. 8 is the pulsation compensating device, shown in detail in Fig. 2. 9 is the body of the device, which is connected by means of packing rings and gland nuts to pressure pipe 5 at its upper end and to manometer 7 at its lower end. The body has a transverse wall 12 in which there is a restricted opening 13. A thin metal disc 10 inside the body normally seats upon wall 12. This disc has an opening 11 of smaller size than opening 13. It is well known that if flow is pulsating, that is to say, rapidly variable in rate, it will normally cause a head in excess of that which would be caused by a steady or uniform flow at the same average rate. The head $h$ shown by manometer would then be too high and the flow calculated from that head would be in excess of the actual. The function of disc 10 and orifice 11 is to restrict upward registration of manometer liquid to a greater extent than orifice 13 restricts downward registration. For any particular cycle of pulsations in a flow being measured by the device of Fig. 1 and Fig. 2, it is possible to have orifices 11 and 13 of such size, absolutely and relatively to each other, that the flow indicated by the manometer will be correct for that flow cycle. It is however true that for some other cycle of pulsation, this same combination might not be correct. Furthermore, the use of mercury is very disadvantageous to the operation of the compensating device for the reason that its great weight and inertia make it unresponsive to rapid fluctuations in head. A manometer meter indicates only and does not lend itself conveniently to recording. A metal float may of course be carried on the surface of the mercury and this float will rise with the mercury column. The motion may then be taken out through a stuffing box, or by electrical or magnetic means, to a recording device. Such methods are however complicated and subject to friction and other defects.

My improved meter, shown in Figs. 3 to 11, is devised to overcome the above objections and other difficulties inherent to meters employing mercury. In Fig. 3, 15 is the shell or body of the meter, fitted with top cover 16 and bottom cover 17 to form a pressure body. An inner flange or shoulder 18 provides for holding cylinder 19, which may be pressed or otherwise held in position. A piston 20 is suspended from lever arm 21 by means of spring 22, bolt 23 and nut 24. The piston is concentric with cylinder 19 but is of materially smaller diameter so that it does not come into direct contact. Bridging the annular space between piston and cylinder is a flexible elastic membrane 25 of rubber or other suitable material. Fig. 10 shows an enlarged part section of such membrane as made but before being put in place. In Fig. 11, the large end of the truncated cone surface of the membrane is shown as drawn up to surround the small end, forming a U shape section. Piston 20 is then inserted into the inner wall of the U and the outer wall is turned down over the top end of cylinder 19 as shown by dotted lines in Fig. 11 and in place in Fig. 3. The small end of membrane is then made fast to the piston by cementing or by binding with cord or wire 26. The large end is similarly bound to the outer diameter of cylinder 19. The function of membrane 25 is to form a leakless and frictionless packing between cylinder and piston, permitting piston to rise or fall as the two sides of the U shape section, confined between outer wall of piston and inner wall of cylinder, roll from one position to the other.

In my co-pending application on "pressure devices," serial number 685,512, filed Jan. 11, 1924, I show and claim the use of a flexible membrane similar to that here shown. I do not in this application claim such membrane broadly, but merely certain features or modifications adapting such membrane to the construction of my improved meter.

The piston, membrane and related parts divide the interior of body 15 into two distinct and separate pressure chambers. Opening 27 communicates with upper chamber 48 and opening 28 communicates with lower chamber 49.

Chamber 49 is subdivided by means of cylinder head 43 to form another chamber 50 which is in restricted communication with chamber 49 through controlled orifices or ports which permit more or less flow through head 43. This head is counterbored to form a recess 35 and has an outer annular seat 45 and an inner seat 44, on which seats a thin disc 30 normally rests. Leading from recess 35 to chamber 49 is a series of orifices 36, preferably arranged in a semi-circle as shown in Fig. 4. Disc 30 also has one or more orifices 47 of less aggregate area than orifices 36. Shutter 33 is mounted on the underside of head 43 by means of stud 32 and nut 34. This mounting permits shutter 33 to be rotated about stud 32 as an axis. The shutter is bounded by two arcs as shown in Fig. 5, the smaller arc 51 being of such radius that this portion does not cover orifices 36 at any position of the shutter, but the larger arc 52 is of such radius as to cover more or less of the orifices 36 depending on the angular position of the shutter. In Fig. 3, orifice at the left is shown as covered while orifice at the right is open. The angle covered by arc 52 is less than the angle covered by the extreme orifices of the series in head 43. In other words there is no position of the shutter which will close off all of the orifices. Disc 30 has an opening 46 which is a free guiding fit on hub of stop collar 31. The upper flange of this collar serves to limit the possible lift of disc 30. Even when the disc rests on seats 44 and 45, there is restricted communication between chamber 49 and chamber 50, through orifices 47 and one or more orifices 36.

If a fluid, for example water, is flowing at a steady and uniform rate of flow in pipe 1—2, pressure pipe 5 connected to opening 27 and pressure pipe 6 to opening 28, then the pressures on opposite sides of the orifice will be transmitted to opposite sides of piston 20. The portion of membrane suspended from piston 20 is functionally a part of the piston and the area of this portion being known, the head at the orifice can be determined by the down pull on lever 21 exerted by the piston through spring 22. Spring 22 will be extended somewhat and the piston will take a position lower than its initial position, but as the membrane rolls away from the piston into the arc portion, the material previously in the arc rolls on to the cylinder wall and the piston is thereby permitted to move as required, without friction and without leakage. It is necessary in measuring water or steam flow, that the body 15 and connecting pressure pipes should be full of water or other liquid and free from pockets of air. Liquid may be introduced into the body through openings 27 and 28 or by removing plugs 61 and 62. Port 60 leads from the extreme upper portion of chamber 49, and by removing plug 61, air can be vented from this space. Port 63 in wall of piston 20 is normally covered by membrane 25 and sealed thereby, but by partially relieving pressure in chamber 48 while applying pressure to chamber 50, air may be forced between the membrane and the piston surface and thereby free all air from chamber 50 by discharging it through port 63 into space 48. It can then be vented from space 48 by removing plug 62. By this system of vent ports all air pockets can be eliminated and false heads avoided.

The pull on lever 21 creates a torque on shaft 65 to which it is attached. Lever 66, fastened to the opposite end of shaft 65 receives an upward pull proportional to the downward pull of piston on lever 21. A weight 67 carried on lever 66 shows, by its position when lever 66 is in balance, the amount of the piston pull, or the head existing across orifice 4. The flow may then be computed from the usual law, being proportional to the square root of the head. Lever 66 may be calibrated by graduations 68 in terms of rate of flow in any desired units. The balancing of lever 66 may be accomplished automatically if desired. One way of doing this is indicated more or less diagrammatically. Electric current from wire 69 is led to the lever. If lever is under-balanced it will contact with brush 71, allowing current to pass through motor 73 and thence to wire 70. This will cause the motor to rotate in one direction and through gears 74 and 75 and sheaves 76 and 77, will move cord 78 and collars 79 and 80, causing collar 79 to pull weight outward until lever is in balance. Contact with brush 71 is then broken and the motor stops. If lever becomes over-balanced, contact is made with brush 72, motor runs in opposite direction and collar 80 moves weight inward until balance is restored. Graphic recording attachments can be applied to give a continuous record of position of weight 67. This is not here shown as such attachments are well known to those skilled in the art.

It will be noted that the angular motion required of shaft 65 is very small, corresponding to the clearance between brushes 71—72 and lever 66. This clearance need be only a very small fraction of an inch. Regardless of the small angular motion of the shaft, there must be a minimum of friction if accurate results are to be had. Shaft 65 might be taken out through a stuffing box but this would inevitably cause friction. One feature of my invention covers means for substantially frictionless transmission of the torque applied to shaft 65. Referring to Figs. 7 and 8, 81 is a flexible ligament fastened in a slot at each end of the shaft and suspended from a fixed support 82. The upper half of the shaft is preferably cut away at the points where the ligaments are inserted so as to bring the point of flexure of the ligament to the center of the shaft. The shaft is suspended so as to pass freely through opening 57 in body 15 and through central hole of coupling 85, then without mechanical contact through a considerable length of hose 83. At its outer end the shaft is enlarged to fit snugly the inside diameter of the hose and the hose is clamped to the shaft by clamp 86, making a pressure tight joint. The inner end of hose is similarly held to coupling 85 by means of clamp 84. The interior of the hose is subject to the pressure existing in chamber 48, out to the point where it is attached to the shaft. It is apparent that turning movement applied to the inner end of the shaft will be transmitted to the outer end and to lever 66, subject only to the resistance which the hose offers to torsion. With a free length of say six inches, an ordinary pneumatic hose has little resistance to torsion through a very small angle. However commercial hose, on account of the usual diagonal location of the reinforcing fabric, usually has a tendency to twist or untwist when subject to varying pressure. To secure hose entirely free from inherent tendency to twist and very free from resistance to torsion mechanically applied, I have devised a special construction of hose for this particular purpose. This hose is made of rubber or other suitable compound and is entirely free from diagonal reinforcing fabric. It is however strongly reinforced circumferentially, preferably by independent bands of cords or other suitable material. As shown in Fig. 7 there are two sets of bands 93 and 94, imbedded in the rubber at different diameters and staggered with relation to each other. This gives ample strength against bursting and leaves the hose practically free from inherent twist due to the pressure, at the same time being quite flexible to permit the small angular motion of shaft 65. A hose made in this way is deficient in longitudinal strength and in case of high pressures, I take care of the endwise pull by means of flexible ties 87 of wire of other suitable form. The wires pass through holes in coupling 85 at one end and the other end is fastened in studs 89. These studs pass through slotted openings 91 in the flange of clamp 86. Tension of wires is adjusted by nuts 90. Holes for the studs are slotted to permit correct angular location. If the hose, despite lack of diagonal fabric reinforcement, has a slight tendency to twist when pressure is applied, this tendency may be offset by locating studs in slots 91 so that the wires are not exactly parallel to the axis of shaft. When pressure is applied to the hose, the wires will then have a slight torsional effect on clamp 86, sufficient to offset the inherent twist of the hose itself. By this combination of circumferentially reinforced hose and adjustable tension wires, I am able to handle any pressure required and to obtain a practically frictionless and accurate transmission of the torque applied to the shaft.

We have so far considered only flow which is non-pulsating. For pulsating flow it is necessary, as previously stated, to have a moving element which is practically free from inertia. This is effected in my improved meter by having only a very slight motion of the levers and weight and by having piston 20 of very light construction. The purpose of spring 22 is to permit piston 20 to move in response to variation in head due to pulsating flow. Piston 20 is usually made of aluminum and of thin section so that its weight is slight. The action of pulsations in the head tends to cause the piston to travel up and down with each variation, and the elasticity of spring 22 permits this to a certain extent. Piston travel causes a flow of liquid between chambers 50 and 49 through head 43. The action is quite similar to the flow through compensating device 8 of Fig. 1 and Fig. 2. Disc 30 corresponds to disc 10, orifices 47 correspond to orifice 11 and orifices 36 correspond to orifice 13. The points of difference are that piston 20 is much more responsive to motion by pulsating head than is the mercury of manometer 7 and that orifices 36 are adjustable to suit different cycles or intensities of pulsation, instead of being fixed as is orifice 13. The total effective area of orifices 36 is controlled by position of shutter 33, closing more or less of the orifice. Lever 37 carries pin 39 which engages in slot 38 of the shutter. Shaft 40 passes out through cover 17 and carries handle 41. Motion of this handle causes the shutter to cover as many of orifices 36 as are needed to give the proper relative area between orifices 47 and those orifices 36 which are in action. Downward flow through head 43 is controlled by orifices 47. When flow is upward, disc 30 lifts from its seat allowing relatively free passage of fluid from recess 35 to chamber 50. Upward flow is then controlled primarily by the resistance offered by those orifices 36 which are permitted by shutter position to be in action. The degree of pulsation compensation is therefore under instant control from the outside without interfering with use of the meter. Correct position of handle 41 may be determined by test or experience.

Pointer 42 travels over marks 42ª on the cover. These marks serve to show the position of shutter 33. The marks may be numbered or otherwise designated to indicate the degree of pulsation compensation in effect.

In metering air and other fixed gases, as contrasted with measuring steam and liquids, it is not usually desirable to fill the meter body and the connecting pressure pipes with liquid. A modification of the construction of Fig. 3 is shown in Fig. 9. Parts not shown in Fig. 9 are identical with those of Fig. 3. Pressure pipes 5 and 6 are connected at openings 27 and 28 as before, but these pipes carry the fluid which is being metered, for example, air. Cylinder 19 has one or more ports 53 which permit pressure from pipe 6 to act directly on the under side of piston 20. To obtain the pulsation compensating action, a liquid L is put into the lower end of the meter body and the lower end of cylinder 19, but below opening 28. Bolt 23 is extended and carries at its lower end a piston 54 submerged in the liquid. This piston fits freely in cylinder 19. An increase of head acting on piston 20 depresses piston 54 and forces some of the liquid through orifices 47 and 36. A decrease of head causes piston 54 to rise and draws liquid through orifices 36, lifting disc 30 and permitting upward flow with less resistance than the previous downward flow. Though the construction is modified by introducing piston 54, the cylinder head, disc, shutter, etc. are the same so that a meter can readily be converted from use on steam to use on air by supplying a few extra parts. The action in correcting for pulsating flow by the variable resistance to liquid flow through head 43, is practically the same as in Fig. 3.

While I have shown the preferred embodiment of my improved meter, I do not limit myself to the construction shown, but what I claim is:

1. A differential gauge comprising a pressure body provided with an opening in one wall thereof, a piston in said body subject to pressures on its opposite faces, a torsion member extending loosely through said opening and connected, within said pressure body, to said piston, supporting means for said member, a torsionally flexible member surrounding a portion of said torsion member and connected at one end to said member and at its other end to the pressure body adjacent said opening, means for applying a counterforce to the external portion of said torsion member, and means to measure the counterforce applied.

2. A differential gauge comprising a pressure body, a piston in said body subject to pressures on its opposite faces, measuring means external to the pressure body, means including a shaft, connecting said piston and said measuring means, and a torsionally flexible member connected at one of its ends to the shaft and at the other end to the pressure body, said flexible member comprising a hose with circumferential reinforcement.

3. A differential gauge comprising a pressure body provided with an opening in one wall thereof, a piston in said body subject to pressures on its opposite faces, a torsion member extending loosely through said opening and connected, within said pressure body, to said piston, supporting means for said torsion member, a torsionally flexible hose surrounding a portion of said torsion member and connected at one end to said member and at its other end to the pressure body adjacent said opening, one or more tension members connected at one end to the pressure body, and means connecting the other end of said tension members to the first mentioned end of said hose.

4. A differential gauge comprising a pressure body provided with an opening in one wall thereof, a piston in said body subject to pressures on its opposite faces, a torsion member extending loosely through said opening and connected, within said pressure body, to said piston, supporting means for said torsion member, a torsionally flexible hose surrounding a portion of said torsion member and connected at one end to said member and at its other end to the pressure body adjacent said opening, one or more tension members connected at one end to the pressure body, a mounting member connecting the other end of said tension members with the first mentioned end of said hose, said tension members supported normally parallel to the axis of said torsion member, said mounting member having means for angular adjustment of said torsion members.

5. In a differential gauge, a pressure body, a cylinder within said pressure body, a piston of smaller diameter than the cylinder, a flexible membrane of U shape section confined between the piston and the cylinder, the end of the inner wall of said membrane being attached to the piston and the end of the outer wall being turned over, forming a third wall substantially cylindrical and parallel with the inner and outer walls of the U shape section, means binding said third wall to the outer cylindrical surface of the cylinder, the combined member comprising said piston and said membrane being subject to pressures on its opposite faces, and means for measuring the net forces applied to said combined member.

6. A differential gauge comprising a pressure body adapted to contain liquid, a cylinder, a piston, a head for the cylinder, a variable orifice through the head, means for varying said orifice at will, a disc normally seating on said head and having one or more orifices of less aggregate area than the maximum orifice through the head, one side of said piston being subject to directly applied pressure, the other side of said piston being subject to pressure applied through the cylinder head, and means for measuring the net force acting on the piston.

7. A differential gauge comprising a pressure body adapted to contain liquid, a cylinder and a piston dividing said pressure body into separate compartments, said compartments being subject to pressures, means offering restriction to motion of the piston in one direction, adjustable restricting means offering restriction to motion of piston in opposite direction, measuring means and means transmitting force from said piston to said measuring means.

8. A flow meter comprising head producing means, a pressure body formed with openings and adapted to contain liquid, a cylinder and a piston dividing said pressure body into separate compartments, means applying differential head from said head producing means to opposite faces of said piston, force measuring means, means, including a spring, transmitting force from said piston to said measuring means and means offering restriction to motion of piston in one direction and other restriction to motion of piston in opposite direction.

In testimony whereof I have signed my name to this specification.

CLARENCE A. DAWLEY.